May 13, 1969      A. DIAMOND      3,444,404
SERVOMOTOR GENERATOR

Filed July 17, 1967      Sheet _1_ of 2

INVENTOR.
ALBERT DIAMOND

BY

ATTORNEY

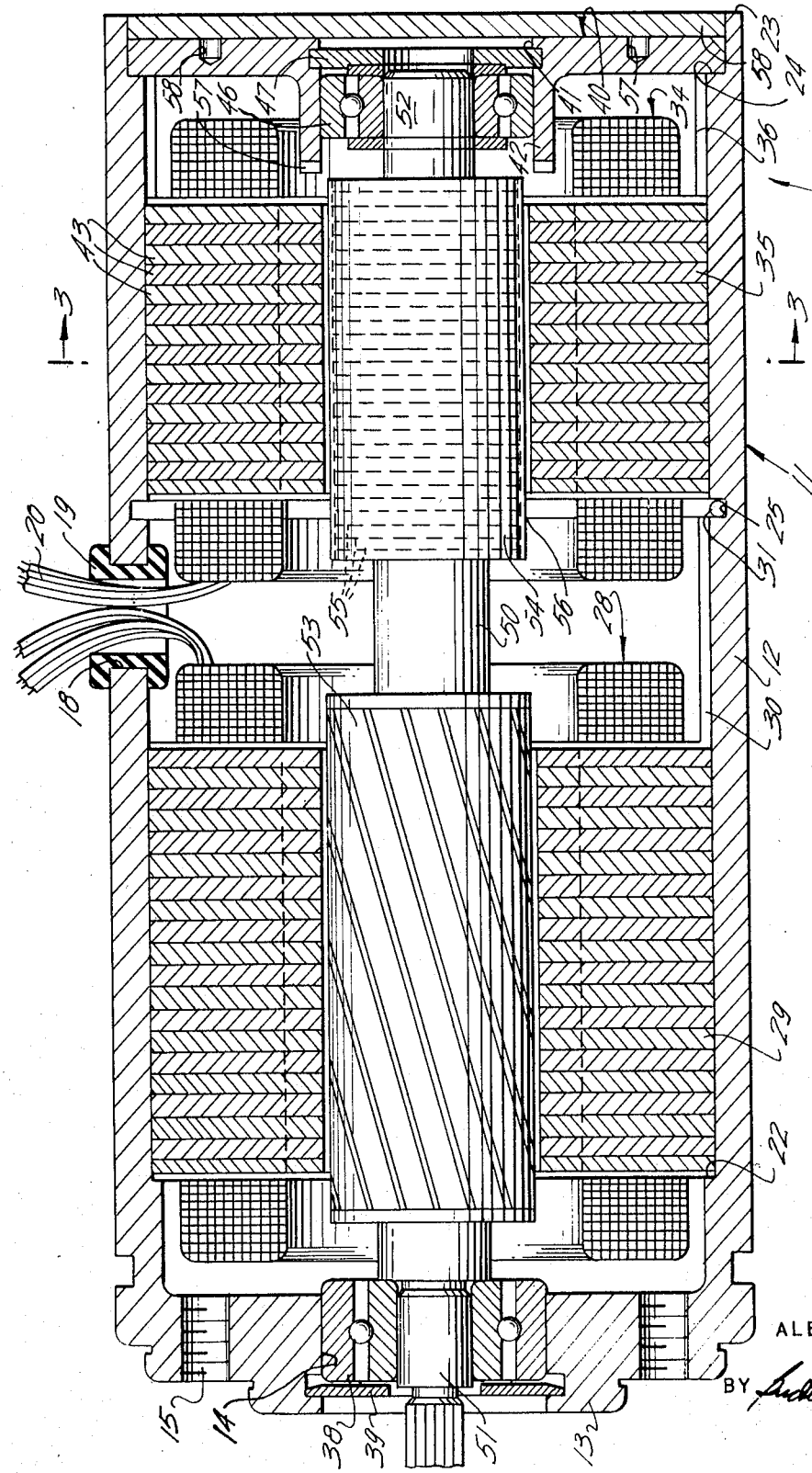

United States Patent Office 3,444,404
Patented May 13, 1969

1

3,444,404
SERVOMOTOR GENERATOR
Albert Diamond, Plainview, N.Y., assignor to Vernitron Corporation, Farmingdale, N.Y., a corporation of New York
Filed July 17, 1967, Ser. No. 653,920
Int. Cl. H02k 47/04, 47/14, 47/20
U.S. Cl. 310—113                                        6 Claims

ABSTRACT OF THE DISCLOSURE

A servomotor-generator combination having a cylindrical housing closed at the motor end and having a null adjusting closure plate at the generator end. A shaft extends through the motor and generator and is journalled in bearings at each housing end. An electrically conductive nonmagnetic sleeve is fixed to a laminated magnetic core on the shaft within the generator stator.

BACKGROUND OF THE INVENTION

As is well known to those versed in the art, servomotor generators have, in the past, required in the generator part thereof a fixed core and a drag cup rotatably surrounding the core and overhanging its journal bearing. This construction, especially in servomotor generators of small size, was relatively difficult and expensive to manufacture.

SUMMARY

Accordingly, it is an important object of the present invention to provide a unique construction of servomotor generator which effectively eliminates the difficulties heretofore inherent in drag-cup constructions, obviates the problems in manufacture, assembly and operation of an overhung bearing construction, and substantially reduces production costs.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIGURE 2 is a longitudinal sectional view taken generally along the line 2—2 of FIGURE 1, somewhat enlarged.

DESCRIPTION OF THE PREFERRED EMBODIMENT

Figure 1:
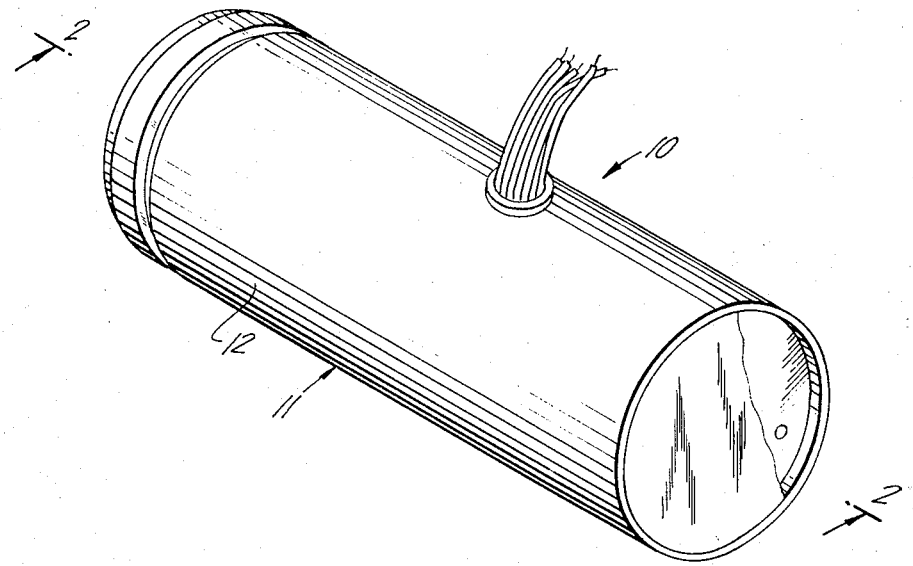
FIGURE 1 is a perspective view showing a servomotor generator constructed in accordance with the present invention, and partly broken away for clarity.

Referring now moree particularly to the drawings, a servomotor generator of the present invention is there generally designated 10, and includes a housing 11 which may be defined by a generally cylindrical body or tube 12 having one end closed, as by an integral end wall 13. The end wall 13 may be formed with a central bearing-receiving opening or thru hole 14, and a plurality of fastener-receiving openings 15, as for mounting, or the like. Medially between the ends of the cylindrical body 12, there is formed therein a radially extending thru-opening 18, which may be provided with an annular insert or grommet 19 for the protective passage therethrough of wiring 20.

Interiorly of the cylindrical or tubular body 12, adjacent to and spaced from the end wall 13, there may be formed an internal annular shoulder 22. The end 23 of body 12 may be formed open, and adjacent to and spaced inward therefrom there may be formed an internal annular shoulder 24 facing toward the end 23. Medially between opposite ends of the elongate cylindrical body 12, proximate to the thru hole 18, on the side thereof adjacent to body end 23, there may be formed an internal annular groove 25.

A motor assembly is generally designated 28, being located concentrically within the housing body 12 on one side of the thru opening 18 adjacent to the housing end wall 13. More specifically, the motor assembly 28 may include a generally annular stator 29, which may be of essentially conventional construction, being conformably engaged in the housing body 12 and located therein abutting the internal shoulder 22. A spacer or ring segment 30 is conformably engaged interiorly of the housing body 12 between the motor stator 29 and the internal groove 25. Located in the groove 25 may be a retaining ring 31 serving to fix the spacer 30 and motor stator 29 in position within the housing body 12.

Adjacent to the housing end 23, interiorly of the housing, is located a generator assembly, generally designated 34. The generator assembly 34 includes an annular generator stator 35, of generally cylindrical configuration and which may be substantially conventional in construction. The generator stator 35 is conformably engaged coaxially within the housing body 12 in abutting engagement with the retaining ring 31; and, an annular spacer 36 is engaged in the housing body 12 adjacent to end 23 between the generator stator 35 and shoulder 24. Conventional wiring from the motor stator 29 and generator stator 35 may exit, as at 20, through the grommeted hole 18.

Located in the central opening 14 of housing end wall 13 may be a suitable rotatable support or journal bearing 38, being protectively retained as by a retaining ring 39. Adjacent to the housing body end 23 is located a null-adjustment member 40. In the illustrated embodiment, the null-adjustment member may assume the configuration of a generally circular or annular plate, fabricated of magnetically soft material and conformably inserted inwardly through the housing end 23 in abutting engagement with the shoulder 24. The adjustment member or plate 40 may be formed centrally thereof with a coaxial thru opening 41, and on its inner side with an annular flange or inwardly extending cylindrical wall 42 surrounding the opening 41. That is, the annular flange or tube 42 of the null-adjustment plate 40 advantageously extends partially into the generator stator 35 toward a central region thereof.

Figure 3:
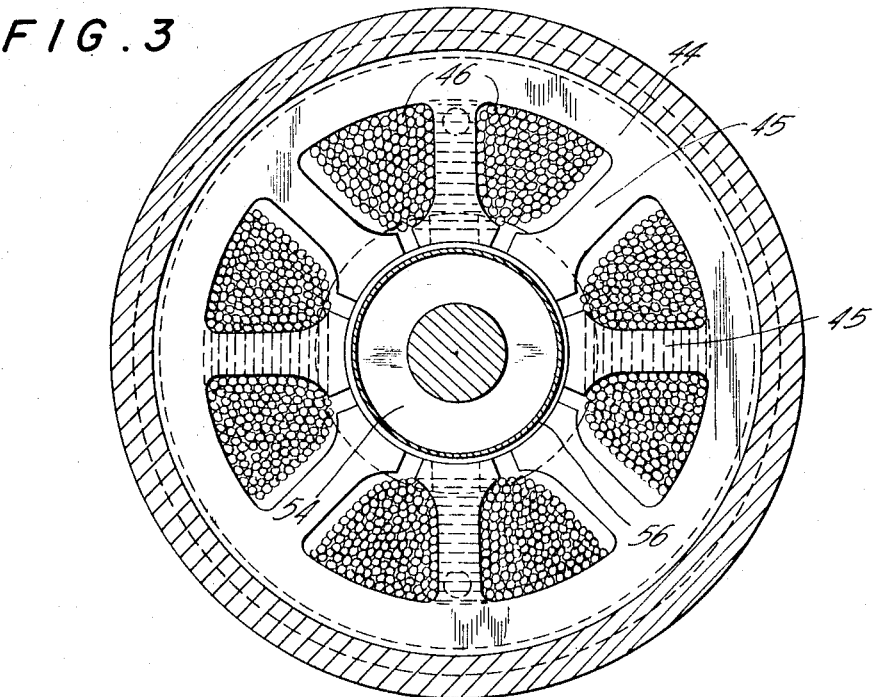
FIGURE 3 is a transverse sectional view taken generally along the line 3—3 of FIGURE 2.

As best seen in FIGURES 2 and 3, the generator stator 35 may be fabricated of a stack of plates or laminations 43 arranged in facing engagement with each other, each lamination being of magnetically soft material and configured to define an outer generally circular portion or rim 44, and a plurality of angularly spaced, radially inwardly extending portions or teeth 45. The teeth of the several laminations 43 are arranged in alignment with each other, and the windings 46 inserted about an aligned set of teeth. However, the number of teeth is not critical, and the specific generator-stator construction may be conventional. For the purpose of this invention at least one coil is required for each pole and a sundry number of coils may distributed per pole as required.

Mounted in the inward extension 42 of adjustment member 40 is a rotary support or journal bearing 46, properly located by suitable retaining means 47 carried by the adjustment member. An elongate shaft 50 extends coaxially within the cylindrical housing body 12, through the motor stator 29 and generator stator 35, having one end portion 51 extending beyond the motor stator and rotatably supported by the bearing 38, and having its other end portion 52 extending beyond the generator stator and rotatably supported by the bearing 46. Thus, the shaft 50 is rotatably supported at its opposite ends for axial rotation within the housing 11, and motor and generator stators. Further, the shaft 50 is provided with a motor rotor 53 interiorly within the motor stator 29 for rotation with the shaft. Within the generator stator 35, the shaft 50 is provided with a coaxial, generally cylindrical hub or core 54 rotatable with the shaft interiorly of the generator stator. The hub or core 54 has been found to operate more satisfactorily when fabricated of a plurality of laminae, as at 55, each lamination being of an annular or disclike configuration surrounding the shaft 50. While it is not absolutely essential that the hub 54 be of laminated construction, this is preferred, and it is also preferred that the material of the core 54 be magnetically soft so as to have low magentic retentivity. In particular, such materials as Swedish iron, Mumetal, nickel iron, silicon steel and vanadium permadur have been found advantageous.

Snugly surrounding and affixed to the hub or core 54, and rotatable therewith, is an annular or cylindrical sleeve 56, which may be longitudinally coextensive with the core, and is advantageously fabricated of nonmagnetic, electrically conductive material, such as copper or the like. The wall thickness of sleeve 56 may be selected to optimize the amplitude and phase angle of the output voltage with respect to the excitation voltage, it being only essential that the conductor define a shorted turn to cut magentic flux upon rotation of shaft 50.

In practice, the construction described above has been found highly satisfactory, the rotary core 54 affording a highly suitable magnetic return path substantially devoid of frequency voltage variation, while the sleeve 56 produces the desired rotational voltage.

In order to provide the necessary null adjustment, the adjustment member 40 is formed at one or more locations with any suitable formation disturbing the symmetry thereof, such a slots at 57. Thus, in assembly of the device, null adjustment is achieved by rotation of the adjustment member 40 to a proper location, after which a generally circular retaining plate 58 may be permanently secured in position over the adjustment member flush with the body end 23, as by adhesive, or other suitable means. Blind holes, as at 58, for a spanner wrench, may be provided on the outside surface of member 40 to facilitate rotation thereof.

From the foregoing, it is seen that the present invention provides servomotor generators (also sometimes called damping tachometers) which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In a servomotor generator, the combination comprising an elongate housing, a generally annular motor stator fixed in said housing adjacent to one housing end, a generally annular generator stator fixed in said housing adjacent to the other housing end, a shaft passing centrally through said motor and generator stators, journal means in said housing supporting said shaft for axial rotation of said shaft, a motor rotor on said shaft within said motor stator, a hub of magnetically soft material carried by said shaft within said generator stator for rotation with said shaft, and a nonmagnetic electrically conductive annular sleeve surrounding and affixed to said hub for flux-cutting rotation therewith.

2. The combination according to claim 1, said hub comprising laminae of magnetically soft material.

3. The combination according to claim 1, in combination with a magnetically soft null-adjustment member at said other housing end, said member being asymmetrical with respect to the shaft axis and magnetically oriented for null adjustment.

4. The combination according to claim 3, said housing comprising an elongate body having a generally cylindrical internal configuration receiving said motor and generator stators, and an end wall on one end of said body defining said one end of said housing, said null-adjustment member comprising a closure plate at the other end of said body.

5. The combination according to claim 4, said end-wall closure plate carrying one of said journal means and said first mentioned end wall carrying another of said journal means.

6. The combination according to claim 1, wherein said hub is fabricated of material selected from the group consisting of Swedish iron, Mumetal, nickel iron, silicon steel, vanadium permadur, and the like.

References Cited

UNITED STATES PATENTS

| | | | |
|---|---|---|---|
| 2,259,288 | 10/1941 | Blankenbuehler | 310—113 |
| 2,546,736 | 3/1951 | Fry | 310—113 |
| 2,778,960 | 1/1957 | Anderson | 310—113 |
| 2,787,824 | 4/1957 | Kaczor | 310—113 |
| 3,332,005 | 7/1967 | McAdams | 310—192 |

WARREN E. RAY, *Primary Examiner.*

R. SKUDY, *Assistant Examiner.*

U.S. Cl. X.R.

310—192